(12) United States Patent
Ito et al.

(10) Patent No.: US 11,228,027 B2
(45) Date of Patent: Jan. 18, 2022

(54) POSITIVE ELECTRODE ACTIVE MATERIAL FOR ALKALINE SECONDARY BATTERY AND ALKALINE SECONDARY BATTERY INCLUDING THE POSITIVE ELECTRODE ACTIVE MATERIAL

(71) Applicants: FDK CORPORATION, Tokyo (JP); FUJITSU LIMITED, Kanagawa (JP)

(72) Inventors: Takeshi Ito, Tokyo (JP); Yuzo Imoto, Tokyo (JP); Masaru Kihara, Tokyo (JP); Takayuki Yano, Tokyo (JP); Shigekazu Yasuoka, Tokyo (JP); Shuuichi Doi, Isehara (JP); Takashi Yamazaki, Kawasaki (JP); Yuji Kataoka, Yokohama (JP)

(73) Assignees: FDK CORPORATION, Tokyo (JP); FUJITSU LIMITED, Kanagawa (JP)

( * ) Notice: Subject to any disclaimer, the term of this patent is extended or adjusted under 35 U.S.C. 154(b) by 0 days.

(21) Appl. No.: 16/773,367

(22) Filed: Jan. 27, 2020

(65) Prior Publication Data
US 2020/0161646 A1 May 21, 2020

Related U.S. Application Data

(62) Division of application No. 15/425,816, filed on Feb. 6, 2017, now abandoned.

(30) Foreign Application Priority Data

Feb. 12, 2016 (JP) .................................. 2016-024991

(51) Int. Cl.
*H01M 4/36* (2006.01)
*H01M 4/52* (2010.01)
(Continued)

(52) U.S. Cl.
CPC ............ *H01M 4/366* (2013.01); *C01G 51/04* (2013.01); *C01G 53/04* (2013.01); *H01M 4/32* (2013.01);
(Continued)

(58) Field of Classification Search
CPC ............ H01M 4/52; H01M 4/50; H01M 4/32; H01M 10/30; C01G 53/04
See application file for complete search history.

(56) References Cited

U.S. PATENT DOCUMENTS

2004/0053114 A1* 3/2004 Furukawa ........... H01M 10/345 429/50
2006/0257742 A1 11/2006 Kato et al.
2008/0274405 A1* 11/2008 Kobayashi ............. C01G 53/04 429/223

FOREIGN PATENT DOCUMENTS

CN 1806353 A 7/2006
EP 0932211 A1 7/1999
(Continued)

OTHER PUBLICATIONS

Masanori Morishita, Seijiro Ochiai, Tadashi Kakeya, Tetsuya Ozaki, Yoshiteru Kawabe, Masaharu Watada, Shigeo Tanase, and Tetsuo Sakai, Structural Analysis by Synchrotron XRD and XAFS for Maganese-Substituted . . . Nickel Hydroxide Electrode, Journal of The Electrochemical Society, 2008, 9 pages, Japan.

*Primary Examiner* — Jeremiah R Smith
(74) *Attorney, Agent, or Firm* — Kinney & Lange, P.A.

(57) ABSTRACT

A nickel-hydrogen secondary battery includes an electrode group comprising a separator, a positive electrode, and a negative electrode, and the positive electrode contains a positive electrode active material including a base particle comprising a nickel hydroxide particle containing Mn in solid solution and a conductive layer comprising a Co compound and covering the surface of the base particle,
(Continued)

wherein the X-ray absorption edge energy of Mn detected within 6500 to 6600 eV by measurement with an XAFS method is 6548 eV or higher.

8 Claims, 2 Drawing Sheets

(51) Int. Cl.
  *H01M 4/32*    (2006.01)
  *C01G 53/04*    (2006.01)
  *C01G 51/04*    (2006.01)
  *H01M 4/50*    (2010.01)
  *H01M 10/34*    (2006.01)
  *H01M 10/30*    (2006.01)
  *H01M 4/02*    (2006.01)

(52) U.S. Cl.
  CPC ............... *H01M 4/50* (2013.01); *H01M 4/52* (2013.01); *H01M 10/345* (2013.01); *C01P 2002/50* (2013.01); *C01P 2002/52* (2013.01); *C01P 2004/80* (2013.01); *H01M 10/30* (2013.01); *H01M 2004/028* (2013.01); *H01M 2300/0014* (2013.01)

(56) References Cited

FOREIGN PATENT DOCUMENTS

| | | | |
|---|---|---|---|
| JP | 09-115543 | A | 5/1997 |
| JP | 10-154508 | A | 6/1998 |
| JP | 11317224 | A | 11/1999 |
| JP | 2000003706 | A | 1/2000 |
| JP | 2001185138 | A | 7/2001 |
| JP | 2013251061 | A | 12/2013 |

* cited by examiner

POSITIVE ELECTRODE ACTIVE MATERIAL FOR ALKALINE SECONDARY BATTERY AND ALKALINE SECONDARY BATTERY INCLUDING THE POSITIVE ELECTRODE ACTIVE MATERIAL

CROSS-REFERENCE TO RELATED APPLICATION(S)

This application is a divisional of U.S. application Ser. No. 15/425,816, filed Feb. 6, 2017 for "POSITIVE ELECTRODE ACTIVE MATERIAL FOR ALKALINE SECONDARY BATTERY AND ALKALINE SECONDARY BATTERY INCLUDING THE POSITIVE ELECTRODE ACTIVE MATERIAL" by Takeshi Ito, Yuzo Imoto, Masaru Kihara, Takayuki Yano, Shigekazu Yasuoka, Shuuichi, Doi, Takashi Yamazaki, and Yuji Kataoka, which is incorporated by reference herein, and which in turn claims priority to Japanese Application No. 2016-024991 filed on Feb. 12, 2016.

BACKGROUND

Technical Field

The present disclosure relates to a positive electrode active material for an alkaline secondary battery and an alkaline secondary battery including the positive electrode active material.

Description of the Related Art

Nickel-hydrogen secondary batteries are known as one of alkaline secondary batteries. Known examples of positive electrodes for such nickel-hydrogen secondary batteries include unsintered positive electrodes. Such unsintered positive electrodes are produced in the following manner, for example.

First, a nickel hydroxide particle as a positive electrode active material, a binder, and water are kneaded together to prepare a positive electrode admixture slurry, and a positive electrode base material comprising a nickel foam sheet having a porous structure is filled with the positive electrode admixture slurry. Then, an intermediate product of a positive electrode is formed through a drying process for the slurry and a rolling process to densify the positive electrode admixture. Thereafter, the intermediate product is cut in predetermined dimensions and thus an unsintered positive electrode is produced. Such unsintered positive electrodes have an advantage of allowing for filling with a positive electrode active material in a higher density than in the case of sintered positive electrodes.

Nickel hydroxide in a single substance has a low conductivity, and it is thus difficult for unsintered positive electrodes to enhance the utilization efficiency of a positive electrode active material. In view of this, a nickel hydroxide particle is typically subjected to a treatment to enhance the conductivity, and the nickel hydroxide particle with an enhanced conductivity is used. Known examples of such nickel hydroxide particles with an enhanced conductivity include a nickel hydroxide particle disclosed in Japanese Patent Laid-Open No. 10-154508. Specifically, cobalt hydroxide is precipitated on the surface of a nickel hydroxide particle and then heat-treated to convert the cobalt hydroxide on the surface of the nickel hydroxide particle into cobalt oxyhydroxide. Since cobalt oxyhydroxide is excellent in conductivity, cobalt oxyhydroxide on the surface of the nickel hydroxide particle comes into interparticle contact to form a conductive network. As a result, the conductivity of a positive electrode is enhanced, which leads to enhancement of the utilization efficiency of a positive electrode active material.

As alkaline secondary batteries are increasingly used for a wide variety of applications, the desire for improvement of the cycle life characteristics has been growing. In such circumstances, containing Mn in solid solution in a nickel hydroxide particle is known as one example of techniques to improve the cycle life characteristics of an alkaline secondary battery (e.g., see Japanese Patent Laid-Open No. 09-115543).

In order to achieve further improvement of the performance of an alkaline secondary battery, development of a battery having an enhanced utilization efficiency of a positive electrode active material and improved cycle life characteristics in combination has been desired in recent years. From such a viewpoint, attempts have been made to impart excellent cycle life characteristics to a battery having an enhanced utilization efficiency of a positive electrode active material through development of an alkaline secondary battery with a particle obtained by forming a cobalt compound layer, which is excellent in conductivity, on the surface of a nickel hydroxide particle containing Mn in solid solution as a positive electrode active material particle.

If a battery connected to a circuit is left to stand for a long period, the battery discharges to a voltage lower than a predetermined cut-off voltage, which is what is called deeply-discharged state.

If a battery having an enhanced utilization efficiency of a positive electrode active material and improved cycle life characteristics in combination as described above, that is, a battery with a particle obtained by forming a cobalt compound layer, which is excellent in conductivity, on the surface of a nickel hydroxide particle containing Mn in solid solution as a positive electrode active material particle comes into a deeply-discharged state, the following failures are caused.

First, the potential of the positive electrode becomes equal to or lower than the reduction potential of cobalt oxyhydroxide due to the deep discharge, and as a result the cobalt oxyhydroxide forming the conductive network on the surface of the positive electrode active material is reduced. As the cobalt oxyhydroxide is reduced, the cobalt oxyhydroxide layer on the surface of the nickel hydroxide particle is partly lost and the conductive network is destroyed. As a result, the chargeability of the battery is degraded and a capacity comparable to the initial capacity cannot be obtained any more even if the battery is charged again. In other words, the capacity recovery rate of the battery is lowered.

In addition, the Mn contained in solid solution in the nickel hydroxide particle involves in accelerating reduction of cobalt oxyhydroxide when the battery comes into a deeply-discharged state, and thus the presence of Mn promotes destruction of the conductive network. Moreover, the Mn itself is reduced and eluted in a deeply-discharged state, and as a result the bulk portion of nickel hydroxide becomes brittle and deteriorated. As the bulk portion of nickel hydroxide is deteriorated, the capacity of the battery is further lowered. It follows that a battery with nickel hydroxide containing Mn in solid solution is excellent in cycle life characteristics but the capacity recovery rate is largely lowered when the battery comes into a deeply-discharged state.

A battery whose capacity recovery rate has been lowered as described above cannot provide a required capacity even if the battery is charged again, which makes it difficult to normally operate electric devices or the like.

SUMMARY

A positive electrode active material for an alkaline secondary battery is provided, including a base particle comprising a nickel hydroxide particle containing Mn in solid solution and a conductive layer comprising a Co compound and covering the surface of the base particle, wherein the X-ray absorption edge energy of the Mn detected within 6500 to 6600 eV by measurement with an XAFS (X-ray Absorption Fine Structure) method is 6548 eV or higher.

BRIEF DESCRIPTION OF THE DRAWINGS

The present disclosure will become more fully understood from the detailed description given hereinafter and the accompanying drawings which are given by way of illustration only, and thus, are not limitative of the present invention, and wherein.

DETAILED DESCRIPTION

Hereinafter, a nickel-hydrogen secondary battery 2 according to an embodiment of the present disclosure (hereinafter, referred to as battery) will be described with reference to the accompanying drawings.

Although the battery 2 to be used for the present disclosure is not limited, an AA cylindrical battery 2 shown in FIG. 1 used for the present disclosure will be described as an example.

Figure 1:
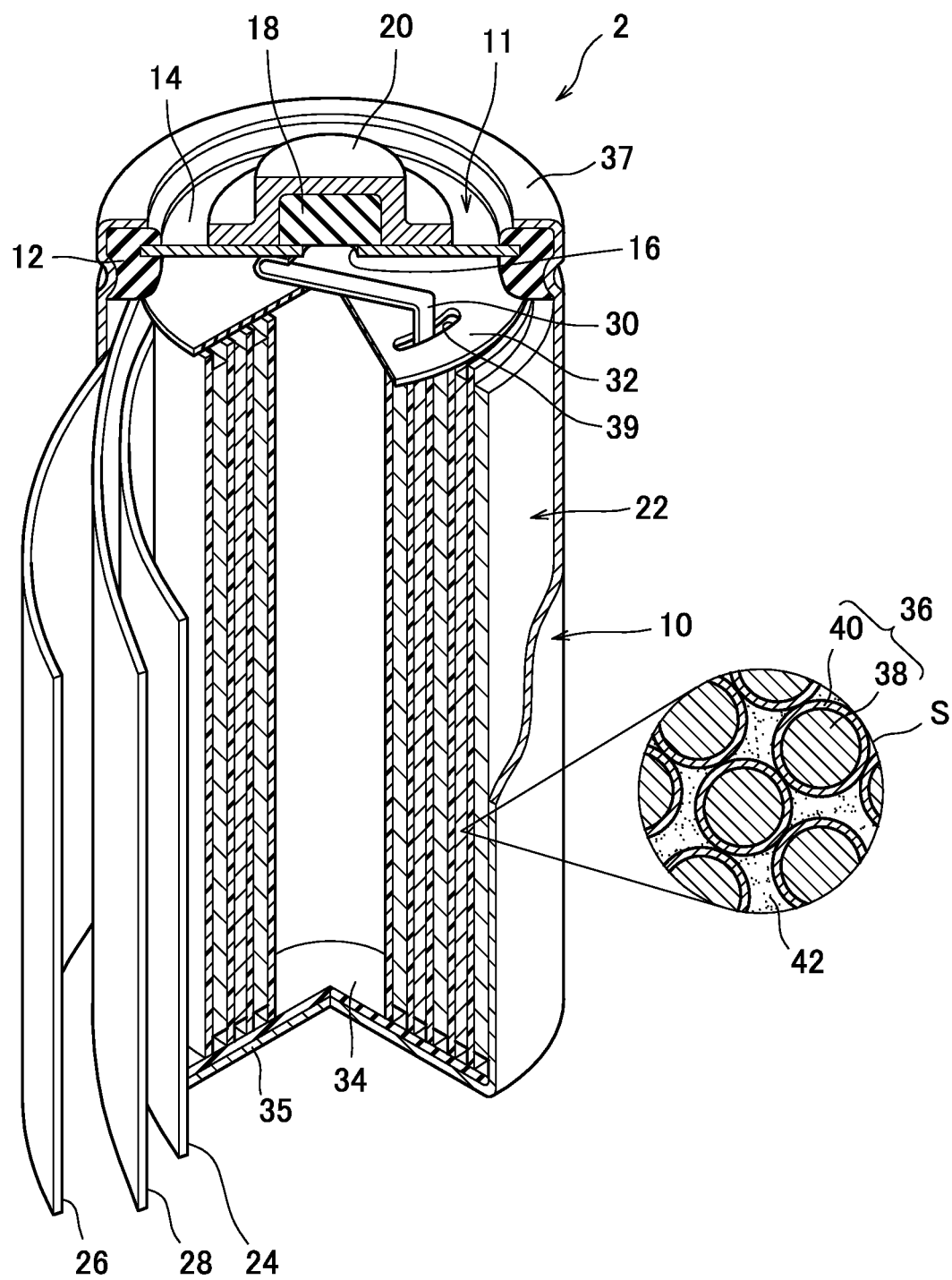
FIG. 1 is a perspective view illustrating a nickel-hydrogen secondary battery according to one embodiment of the present disclosure by partial cutting.

As illustrated in FIG. 1, the battery 2 includes an outer can 10 having a bottomed cylindrical shape with an open top. The outer can 10 has conductivity, and its bottom wall 35 functions as a negative electrode terminal. To the opening of the outer can 10, a sealing element 11 is fixed. The sealing element 11, which includes a lid plate 14 and a positive electrode terminal 20, seals the outer can 10 and provides the positive electrode terminal 20. The lid plate 14 is a circular member having conductivity. In the opening of the outer can 10, the lid plate 14 and a ring-shaped insulation packing 12 surrounding the lid plate 14 are disposed, and the insulation packing 12 is fixed to an opening periphery 37 of the outer can 10 through caulking of the opening periphery 37 of the outer can 10. It follows that the lid plate 14 and the insulation packing 12 cooperate to airtightly block the opening of the outer can 10.

The lid plate 14 has a central through-hole 16 at its center, and a valving element 18 made of rubber to plug the central through-hole 16 is disposed on the outer surface of the lid plate 14. Onto the outer surface of the lid plate 14, the positive electrode terminal 20 having a cylindrical shape with a flange and made of metal is electrically connected in such a way as to cover the valving element 18. The positive electrode terminal 20 pushes the valving element 18 toward the lid plate 14. A degassing hole, which is not illustrated, is opened in the positive electrode terminal 20.

In normal conditions, the central through-hole 16 is airtightly closed with the valving element 18. If a gas is generated in the outer can 10 and the inner pressure increases, on the other hand, the valving element 18 is compressed due to the inner pressure to open the central through-hole 16, and as a result the gas is discharged from the outer can 10 to the outside through the central through-hole 16 and the degassing hole (not illustrated) of the positive electrode terminal 20. It follows that the central through-hole 16, the valving element 18, and the positive electrode terminal 20 serve as a safety valve for the battery.

An electrode group 22 is contained in the outer can 10. The electrode group 22 includes a positive electrode 24, a negative electrode 26, and a separator 28 each of which is band-shaped, and they are spirally wound with the separator 28 sandwiched between the positive electrode 24 and the negative electrode 26. In other words, the positive electrode 24 and the negative electrode 26 are laminated together with the separator 28 sandwiched therebetween. The outermost periphery of the electrode group 22 is formed by a part (outermost peripheral portion) of the negative electrode 26 and contacts the inner peripheral wall of the outer can 10. It follows that the negative electrode 26 and the outer can 10 are electrically connected together.

In the outer can 10, a positive electrode lead 30 is disposed between one end of the electrode group 22 and the lid plate 14. More specifically, one end of the positive electrode lead 30 is connected to the positive electrode 24 and the other end is connected to the lid plate 14. Thus, the positive electrode terminal 20 and the positive electrode 24 are electrically connected together via the positive electrode lead 30 and the lid plate 14. A circular upper insulating member 32 is disposed between the lid plate 14 and the electrode group 22, and the positive electrode lead 30 extends through a slit 39 provided in the upper insulating member 32. Similarly, a circular lower insulating member 34 is disposed between the electrode group 22 and the bottom of the outer can 10.

The outer can 10 further contains a predetermined quantity of an alkaline electrolytic solution (not illustrated) injected therein. The electrode group 22 is impregnated with the alkaline electrolytic solution, and the alkaline electrolytic solution allows chemical reaction between the positive electrode 24 and the negative electrode 26 in charging/discharging (charge/discharge reaction) to proceed. The alkaline electrolytic solution to be used is preferably an alkaline electrolytic solution containing at least one of KOH, NaOH, and LiOH as a solute.

For the material of the separator 28, for example, a polyamide nonwoven fabric or a polyolefin nonwoven fabric such as a polyethylene nonwoven fabric and a polypropylene nonwoven fabric may be used. It is preferred to impart a hydrophilic functional group to such a polyamide nonwoven fabric or polyolefin nonwoven fabric.

The positive electrode 24 includes a conductive positive electrode base material having a porous structure and a positive electrode admixture held in voids in the positive electrode base material.

For the positive electrode base material, for example, a nickel foam sheet may be used.

The positive electrode admixture contains a positive electrode active material particle 36 and a binder 42, as schematically illustrated in the circle S in FIG. 1. The binder 42 functions to bind the positive electrode active material particles 36 together, and simultaneously bind the positive electrode active material particles to the positive electrode base material. For the binder 42, for example, carboxymethyl cellulose, methyl cellulose, a PTFE (polytetrafluoroethylene) dispersion, or an HPC (hydroxypropyl cellulose) dispersion may be used.

The positive electrode active material particle 36 includes a base particle 38 and a conductive layer 40 covering the surface of the base particle 38.

The base particle 38 comprises a nickel hydroxide particle containing Mn in solid solution.

The content of Mn in solid solution in nickel hydroxide is over 0% by mass, and preferably 0.1% by mass or more and 2.0% by mass or less based on the quantity of nickel hydroxide.

The Mn contained in solid solution in the nickel hydroxide particle has been subjected to oxidation treatment to provide a higher valence. When the X-ray fluorescence from Mn is measured to acquire the spectrum by using an XAFS (X-ray Absorption Fine Structure) method, the X-ray absorption edge energy of Mn is detected within 6500 to 6600 eV. In embodiments of the present disclosure, Mn having an X-ray absorption edge energy of 6548 eV or higher as measured by using the XAFS method is used.

Now, the XAFS method will be described.

In general, an element has a property of strongly absorbing an X-ray with energy corresponding to its core electron binding energy. A part at which the X-ray absorption coefficient of a substance largely increases is called an absorption edge, and the energy of an X-ray corresponding to the absorption edge is called X-ray absorption edge energy. Different elements have different core electron binding energy. If an element is irradiated with an X-ray with energy higher than the core electron binding energy of the element, the core electron is released and transitions to an unoccupied states, and as a result the X-ray absorption coefficient increases. Accordingly, observation of the X-ray absorption spectrum including the absorption edge for an element provides information on the X-ray absorption fine structure (XAFS oscillation) reflecting the local structure around an element of interest, and thus the local structure around an element of interest can be understood through analysis of the XAFS oscillation. In addition, the position of an absorption edge is known to shift due to the change of electronic state of an element, and thus the valence of an element of interest can be understood through comparison of the absorption edge. Example of measurement methods to acquire an average X-ray absorption spectrum of a sample as described above by using the XAFS method include a transmission method in which a sample is irradiated with an X-ray and the X-ray intensities before and after passing through the sample are measured to directly determine the X-ray absorption, and a fluorescence yield method in which a sample is irradiated with an X-ray and X-ray fluorescence emitted from an atom excited due to absorption of the X-ray is measured. Both methods can provide similar results through analysis of the local structure or valence of an element of interest. In embodiments of the present disclosure, the content of Mn in solid solution in nickel hydroxide is over 0% by mass, and preferably 0.1% by mass or more and 2.0% by mass or less, and the quantity of Mn is significantly smaller than that of nickel. Accordingly, it is desirable to use the fluorescence yield method.

Figure 2:
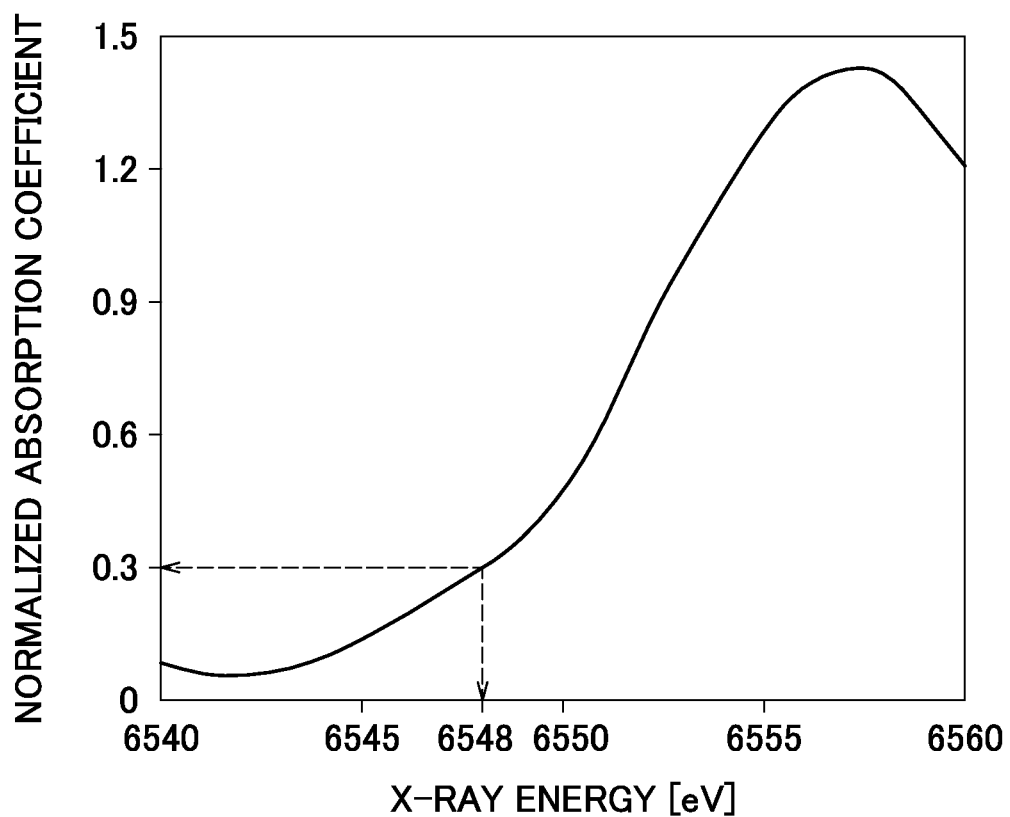
FIG. 2 is a graph showing an XAFS spectrum of a sample of a positive electrode active material in Example 1 acquired by using a fluorescence yield method.

In embodiments of the present disclosure, the intensity of X-ray fluorescence emitted when a sample is irradiated with a synchrotron X-ray is measured by using the fluorescence yield method to acquire an XAFS spectrum (hereinafter, referred to as fluorescence XAFS spectrum). Then, the absorption edge of Mn in the fluorescence XAFS spectrum acquired is determined to analyze the valence of Mn. Specifically, a sample is irradiated with an X-ray and the intensity of X-ray fluorescence emitted from the sample is measured by using the fluorescence yield method while the energy of the X-ray radiation is continuously changed, and thus a fluorescence XAFS spectrum as illustrated in FIG. 2 is acquired. In the graph of the fluorescence XAFS spectrum in FIG. 2, the vertical axis represents absorption coefficients obtained by removing contributions of atoms other than the Mn atom as the background from the XAFS spectrum acquired in the measurement and then normalizing the resultant so that the average value of absorption coefficients from an absorption edge to a high energy region (6800 to 7200 eV), in which the XAFS oscillation reflecting the atomic arrangement around the Mn atom attenuates to be unrecognizable, is 1.0, and the horizontal axis represents the range of X-ray energy from 6540 eV to 6560 eV. In embodiments of the present disclosure, a part at which the absorption coefficient reaches 0.3 in FIG. 2 is defined as the absorption edge of Mn, and the X-ray energy corresponding to the absorption edge is defined as the X-ray absorption edge energy of Mn.

A larger X-ray absorption edge energy of Mn measured indicates a higher degree of oxidation, in other words, a higher valence. It follows that Mn provided with a higher valency such that the X-ray absorption edge energy is 6548 eV or high is used in embodiments of the present disclosure. In the case of Mn, valences corresponding to X-ray absorption edge energy of 6548 eV or high are valences of 3.5 or higher.

Preferably, at least one of cobalt and zinc is further contained in solid solution in the above-described nickel hydroxide. Cobalt contributes to enhancement of the inter-particle conductivity of a positive electrode active material particle, and zinc reduces the swelling of a positive electrode associated with progression of charge/discharge cycles and contributes to improvement of the cycle life characteristics of a battery.

The content of the above element in solid solution in the nickel hydroxide particle based on the quantity of nickel hydroxide is preferably 0.5 to 5.0% by mass for cobalt, and preferably 3.0 to 5.0% by mass for zinc.

The average particle size of the base particle 38 is preferably set within 8 µm to 20 µm. Specifically, the electrode reaction area of an unsintered positive electrode can be increased to provide a battery with a higher power through increasing the surface area of a positive electrode active material, and thus the average particle size of the base particle 38, as a base of the positive electrode active material, is preferably as small as 20 µm or smaller. However, the proportion of the conductive layer 40 to the whole increases as the particle size of the base particle 38 decreases with the thickness of the conductive layer 40 to be precipitated on the surface of the base particle set to a constant value, and as a result the quantity of an Ni compound becomes relatively small, which disadvantageously causes reduction of unit capacity. In view of the production yield of the base particle 38, the particle size is preferably 8 µm or larger. More preferred range is 10 µm to 16 µm.

A Co compound is employed for the conductive layer 40 to cover the surface of the base particle 38. Although the thickness of the conductive layer 40 is not limited, the thickness is preferably 0.1 µm, for example. In order to form a Co compound layer having a thickness of 0.1 µm, metal Co in a quantity of approximately 2.0% by mass to 5.0% by mass based on the total mass of the base particle is required.

It is preferred to employ a high-valent cobalt compound such as cobalt oxyhydroxide (CoOOH) for the Co compound for the conductive layer 40. In addition, the high-valent cobalt compound preferably contains an alkali metal. More preferably, Na is employed for the alkali metal.

Hereinafter, a cobalt compound containing Na is referred to as sodium-containing cobalt compound. More specifically, the sodium-containing cobalt compound is a compound in which Na is incorporated in a crystal of cobalt oxyhydroxide (CoOOH). It is preferred to allow a cobalt compound to contain Na as mentioned above because the homogeneity of the thickness of a conductive layer to be obtained increases.

Here, the homogeneity of the thickness of the conductive layer refers to the degree of thickness difference between thick portions and thin portions in the conductive layer. The smaller the thickness difference between thick portions and thin portions is, the higher the homogeneity is, and the larger the thickness difference between thick portions and thin portions is, the lower the homogeneity is.

If the homogeneity of the thickness of the conductive layer 40 is low, rupture or break of the conductive layer 40 starts at a thin portion of the conductive layer 40 in deep discharge, and the conductive network is partly destroyed. As a result, the capacity recovery rate of a battery to be obtained is lowered. If the homogeneity of the thickness of the conductive layer 40 is high and the thickness is almost homogeneous, on the other hand, rupture or break of the conductive layer is less likely to occur in deep discharge, and the conductive network is maintained in a proper state. As a result, lowering of the capacity recovery rate of a battery to be obtained is reduced.

It is more preferred to allow the cobalt compound layer as the conductive layer 40 to further contain Li because the conductivity of the conductive layer 40 becomes enhanced.

The above base particle 38 can be produced, for example, in the following manner.

First, nickel sulfate and manganese sulfate are weighed so as to achieve a predetermined composition, and these nickel sulfate and manganese sulfate are charged into, for example, a 1 N sodium hydroxide aqueous solution containing ammonium ions, and the resultant is stirred to prepare a mixed aqueous solution. To the mixed aqueous solution, for example, a 10 N sodium hydroxide aqueous solution is gradually added to react, and thus the base particle 38 containing nickel hydroxide as a main component containing Mn in solid solution can be precipitated. In the case that not only Mn but also Zn and Co are allowed to be contained in solid solution in a nickel hydroxide particle, nickel sulfate, manganese sulfate, zinc sulfate, and cobalt sulfate are weighed so as to achieve a predetermined composition, and they are charged into a 1 N sodium hydroxide aqueous solution containing ammonium ions, and the resultant is stirred to prepare a mixed aqueous solution. While the resultant mixed aqueous solution is stirred, a 10 N sodium hydroxide aqueous solution is gradually added to the mixed aqueous solution to react, and thus the base particle 38 containing nickel hydroxide as a main component containing Mn, Zn, and Co in solid solution can be precipitated.

Then, the conductive layer 40 is formed in the following procedure.

The base particle 38 obtained as described above is charged into an ammonia aqueous solution, and to this aqueous solution, a cobalt sulfate aqueous solution is added. Thereby, cobalt hydroxide precipitates on the surface of a core of the base particle 38, and thus a composite particle including the conductive layer 40 comprising cobalt hydroxide is formed. The composite particle obtained is subjected to heat treatment in convection of air in a high temperature environment at a predetermined heating temperature for a predetermined heating duration. In the heat treatment, a temperature of 80° C. to 100° C. is preferably retained for 30 minutes to 2 hours. This heat treatment converts the cobalt hydroxide on the surface of the above composite particle into a highly-conductive cobalt compound (e.g., cobalt oxyhydroxide).

In the case that the conductive layer 40 is allowed to contain Na, which is a preferred mode, a sodium hydroxide aqueous solution is sprayed onto the above composite particle being subjected to heat treatment in convection of air in a high temperature environment. This treatment converts the cobalt hydroxide on the surface of the above composite particle to a highly-conductive cobalt compound (e.g., cobalt oxyhydroxide) and allows the cobalt hydroxide to incorporate Na therein. Thereby, an intermediate product particle covered with the conductive layer 40 comprising a cobalt compound containing Na can be obtained.

It is more preferred to allow the cobalt compound as the conductive layer 40 to further contain Li because the conductivity of the conductive layer 40 becomes enhanced. In order to allow the cobalt compound to contain Na and Li, heat treatment is performed through spraying a lithium hydroxide aqueous solution together with a sodium hydroxide aqueous solution onto the above composite particle being placed in convection of air in a high temperature environment. Thereby, an intermediate product particle covered with the conductive layer 40 comprising a cobalt compound containing Na and Li can be obtained. A cobalt compound in which Li is incorporated in a crystal of cobalt oxyhydroxide (CoOOH) has an extremely high conductivity, and thus a proper conductive network capable of enhancing the utilization efficiency of an active material in a positive electrode can be formed.

The above intermediate product particle is washed with pure water and then subjected to drying.

Subsequently, a sodium chlorite aqueous solution containing sodium chlorite as a solute is prepared in a predetermined quantity. The content of sodium chlorite contained in the sodium chlorite aqueous solution is preferably set to 5.0% by mass to 20.0% by mass. The sodium chlorite aqueous solution prepared is then heated. The heating temperature is preferably set to 50° C. to 80° C. The above intermediate product particle is then charged into the sodium chlorite aqueous solution retained at the heating temperature set, and the resultant is stirred for a predetermined duration for oxidation treatment of Mn. The predetermined duration for stirring is preferably set to 30 minutes to 120 minutes.

The intermediate product particle after the completion of the oxidation treatment is washed with pure water and then dried with hot air at approximately 60° C. Thereby a positive electrode active material particle can be obtained including a base particle comprising a nickel hydroxide particle containing Mn provided with a higher valence in solid solution and a conductive layer comprising cobalt oxyhydroxide containing Na or Li and provided on the surface of the base particle.

Since the positive electrode active material according to embodiments of the present disclosure contains Mn in solid solution, a battery including the positive electrode active material according to embodiments of the present disclosure is basically excellent in charge/discharge cycle characteristics. The Mn contained in solid solution in nickel hydroxide, which has been subjected to the above-described oxidation treatment, has been provided with a higher valence such that the X-ray absorption edge energy is 6548 eV or high. If Mn has been provided with a higher valence in this way, Mn itself is prevented from being reduced and eluted into an alkaline electrolytic solution even when a battery comes into a deeply-discharged state, and in addition reduction of Co in the conductive layer by Mn is also prevented from accelerating. Since reduction and elution of Mn itself is thus prevented, deterioration of the bulk portion of nickel hydroxide is prevented, and thereby lowering of the capacity is prevented. Accordingly, the positive electrode active material according to embodiments of the present disclosure contributes to reduction of lowering of the capacity recovery rate of a battery. Since reduction of Co in the conductive layer by Mn is also prevented from accelerating, destruction of the conductive network is also reduced. Also owing to this, the positive electrode active material according to embodiments of the present disclosure contributes to reduction of lowering of the capacity recovery rate of a battery.

Subsequently, the positive electrode 24 is produced, for example, in the following manner.

First, a positive electrode admixture slurry containing the positive electrode active material particle 36 obtained as described above, water, and the binder 42 is prepared. For example, a nickel foam sheet is filled with the positive electrode admixture slurry, and dried. After being dried, the nickel foam sheet filled with a nickel hydroxide particle, etc., is rolled and cut, and thus the positive electrode 24 is fabricated.

In the positive electrode 24 thus obtained, the positive electrode active material particles 36 comprising the base particle 38 the surface of which is covered with the conductive layer 40 comes into interparticle contact as illustrated in the circle S in FIG. 1, and the conductive layer 40 forms a conductive network.

It is preferred to further add at least one selected from the group comprising a Y compound, Nb compound, W compound, and Co compound, as an additive, to the positive electrode 24. The additive prevents Co from being eluted from the conductive layer 40 when deep discharge is repeated, and destruction of the conductive network is reduced. Accordingly, the additive contributes to improvement of the durability against repeated deep discharge. It is preferred to use, for example, yttrium oxide for the Y compound, to use, for example, niobium oxide for the Nb compound, to use, for example, tungsten oxide for the W compound, and to use, for example, cobalt hydroxide for the Co compound.

The additive is added into the positive electrode admixture, and the content is preferably set in the range of 0.2 to 2.0 parts by mass based on 100 parts by mass of the positive electrode active material particle. This is because an additive content of less than 0.2 parts by mass does not provide an effect of preventing Co from being eluted from the conductive layer, and an additive content of more than 2.0 parts by mass causes saturation of the effect and leads to relative reduction of the quantity of the positive electrode active material, which results in lowering of capacity.

Next, the negative electrode 26 will be described.

The negative electrode 26 includes a band-shaped, conductive negative electrode base, and a negative electrode admixture is held on the negative electrode base.

The negative electrode base comprises a sheet of a metal material with through-holes distributed therein, and for example, a punched metal sheet may be used. The negative electrode admixture fills not only the through-holes of the negative electrode base, but also is held as a layer on both surfaces of the negative electrode base.

The negative electrode admixture contains a hydrogen storage alloy particle capable of occluding/releasing hydrogen as a negative electrode active material, a conductive agent, and a binder. The binder functions to bind the hydrogen storage alloy particle and the conductive agent together, and simultaneously bind the hydrogen storage alloy particle and the conductive agent to the negative electrode base. A hydrophilic or hydrophobic polymer may be used for the binder, and carbon black or graphite may be used for the conductive agent.

The hydrogen storage alloy in the hydrogen storage alloy particle is not limited, and a hydrogen storage alloy commonly used for nickel-hydrogen secondary batteries may be employed.

The negative electrode 26 can be produced, for example, in the following manner.

First, a hydrogen storage alloy powder comprising a hydrogen storage alloy particle, a conductive agent, a binder, and water are kneaded together to prepare a negative electrode admixture paste. The negative electrode admixture paste obtained is applied onto a negative electrode base and dried. After being dried, the negative electrode base with the attached hydrogen storage alloy particle, etc., is rolled and cut, and thus the negative electrode 26 is fabricated.

The positive electrode 24 and the negative electrode 26 each fabricated as described above are spirally wound with the separator 28 sandwiched therebetween, and thus the electrode group 22 is formed.

The electrode group 22 thus obtained is contained in the outer can 10. Subsequently, a predetermined quantity of an alkaline electrolytic solution is injected into the outer can 10. Thereafter, the outer can 10 containing the electrode group 22 and the alkaline electrolytic solution is sealed with the sealing element 11 provided with the positive electrode terminal 20, and thus the battery 2 according to embodiments of the present disclosure can be obtained. The battery 2 obtained is subjected to initial activation treatment to make the battery ready for use.

EXAMPLES

1. Production of Battery

Example 1

(1) Fabrication of Positive Electrode

Nickel sulfate, zinc sulfate, cobalt sulfate, and manganese sulfate were weighed so as to achieve a Zn content of 4.0% by mass, a Co content of 1.0% by mass, and a Mn content of 0.1% by mass each based on the quantity of Ni, and they were added to a 1 N sodium hydroxide aqueous solution containing ammonium ions to prepare a mixed aqueous solution. While the mixed aqueous solution obtained was stirred, a 10 N sodium hydroxide aqueous solution was gradually added to the mixed aqueous solution to react, and then the pH during the reaction was stabilized within 13 to 14 to produce a base particle 38 comprising a nickel hydroxide particle containing nickel hydroxide as a main component containing Zn, Co, and Mn in solid solution.

The base particle 38 obtained was washed three times with pure water in a quantity 10 times as much as that of the base particle 38, and then dehydrated and dried. The particle size of the base particle 38 obtained was measured with a laser diffraction/scattering particle size distribution analyzer, and the mean volume diameter (MV) of the base particle 38 was found to be 11 μm.

Subsequently, the base particle 38 obtained was charged into an ammonia aqueous solution, and a cobalt sulfate aqueous solution was added thereto while the pH during the reaction was maintained within 9 to 10. Thereby, a composite particle including a core of the base particle 38 and a cobalt hydroxide layer having a thickness of approximately 0.1 μm resulting from precipitation of cobalt hydroxide on the surface of the core was obtained.

Then, the composite particle was subjected to heat treatment in convection of oxygen-containing air in an environment of 80° C. for 45 minutes while a 12 N sodium hydroxide aqueous solution was sprayed, by which the cobalt hydroxide on the surface of the composite particle is converted into highly-conductive cobalt oxyhydroxide, and Na is incorporated in the cobalt oxyhydroxide layer, and as a result a conductive layer 40 comprising cobalt oxyhydroxide containing Na is formed. Thereafter, the composite particle including the cobalt oxyhydroxide layer was collected through filtration, and washed with pure water. The washed composite particle was then charged into a sodium chlorite aqueous solution in a quantity 10 times as much as that of the composite particle. Here, the sodium chlorite aqueous solution, being an aqueous solution containing 10% by mass of sodium chlorite, had been heated and was retained at 60° C. And then, the sodium chlorite aqueous solution at 60° C. into which the composite particle had been charged was stirred for 60 minutes for oxidation treatment of Mn contained in solid solution in the base particle. The composite particle after the completion of the oxidation treatment was washed with pure water and dried with hot air at approximately 60° C. Thereby was obtained a positive electrode active material particle 36 including a base particle 38 comprising a nickel hydroxide particle containing Mn provided with a higher valence in solid solution and a conductive layer 40 comprising cobalt oxyhydroxide containing Na and provided on the surface of the base particle 38.

Subsequently, 0.3 parts by mass of a yttrium oxide powder, 0.2 parts by mass of HPC (hydroxypropyl cellulose), 0.2 parts by mass of a PTFE dispersion, and 50 parts by mass of ion-exchanged water were mixed with 100 parts by mass of a positive electrode active material powder comprising the positive electrode active material particle 36 fabricated as described above to prepare a positive electrode admixture slurry, and a sheet of nickel foam as a positive electrode base material was filled with the positive electrode admixture slurry. The nickel foam filled with the positive electrode admixture slurry was subjected to drying, and the nickel foam filled with the positive electrode admixture was then rolled. Thereafter, the nickel foam filled with the positive electrode admixture was cut in a predetermined shape to obtain a positive electrode 24 for the size AA.

(2) Fabrication of Negative Electrode

First, a hydrogen storage alloy powder comprising an LaNi$_5$ particle, as an AB$_5$ type hydrogen storage alloy, was prepared. The particle size of the LaNi$_5$ particle was measured with a laser diffraction/scattering particle size distribution analyzer, and the mean volume diameter (MV) of the LaNi$_5$ particle was found to be 60 μm.

Subsequently, 0.4 parts by mass of a sodium polyacrylate powder, 1.0 part by mass of a carbon black powder, and 30 parts by mass of ion-exchanged water were added to 100 parts by mass of the hydrogen storage alloy powder, and the resultant was kneaded to prepare a negative electrode admixture paste.

The negative electrode admixture paste was homogeneously applied onto both surfaces of a punched metal sheet as a negative electrode base so as to achieve a constant thickness. The punched metal sheet was a thin iron sheet having a thickness of 60 μm and the surface had been nickel-plated.

After the paste was dried, the punched metal sheet holding the negative electrode admixture was rolled, and then cut in predetermined dimensions to obtain a negative electrode 26 for the size AA.

(3) Assembly of Nickel-Hydrogen Secondary Battery

The positive electrode 24 and negative electrode 26 obtained were spirally wound with a separator 28 sandwiched therebetween to fabricate an electrode group 22. The separator 28 used for fabrication of the electrode group 22 comprised a sulfonated polypropylene nonwoven fabric, and the thickness was 0.1 mm (basis weight: 53 g/m$^2$).

Separately, an alkaline electrolytic solution comprising an aqueous solution containing NaOH and LiOH was prepared. The alkaline electrolytic solution had an NaOH concentration of 7.0 N and an LiOH concentration of 1.0 N.

Then, the electrode group 22 was contained in an outer can 10 having a bottomed cylindrical shape, and a predetermined quantity of the alkaline electrolytic solution prepared was injected thereinto. Thereafter, the opening of the outer can 10 was sealed with a sealing element 11, and assembled an AA nickel-hydrogen secondary battery 2 with a nominal capacity of 2000 mAh.

(4) Initial Activation Treatment

The battery 2 obtained was left to stand in an environment of 25° C. for 12 hours, and then three cycles of charging/discharging operation were performed for the battery 2, in each of which the battery 2 was charged at a charging current of 0.1 It for 16 hours and thereafter discharged at a discharging current of 0.2 It to a battery voltage of 1.0 V. By such initial activation treatment, the battery 2 was made ready for use.

Example 2

A nickel-hydrogen secondary battery was fabricated in the same manner as in Example 1 except that the base particle 38 was produced so as to achieve a Mn content of 1.0% by mass.

Example 3

A nickel-hydrogen secondary battery was fabricated in the same manner as in Example 1 except that the base particle 38 was produced so as to achieve a Mn content of 2.0% by mass.

Example 4

A nickel-hydrogen secondary battery was fabricated in the same manner as in Example 1 except that the base particle 38 was produced so as to achieve a Mn content of 2.5% by mass.

Comparative Example 1

A nickel-hydrogen secondary battery was fabricated in the same manner as in Example 1 except that oxidation treatment for Mn contained in solid solution in the base particle was not performed.

Comparative Example 2

A nickel-hydrogen secondary battery was fabricated in the same manner as in Example 2 except that oxidation treatment for Mn contained in solid solution in the base particle was not performed.

Comparative Example 3

A nickel-hydrogen secondary battery was fabricated in the same manner as in Example 3 except that oxidation treatment for Mn contained in solid solution in the base particle was not performed.

Comparative Example 4

A nickel-hydrogen secondary battery was fabricated in the same manner as in Example 4 except that oxidation treatment for Mn contained in solid solution in the base particle was not performed.

2. Evaluation of Positive Electrode Active Material and Nickel-Hydrogen Secondary Battery (1) Analysis by Using Fluorescence XAFS Method In each of Examples 1 to 4 and Comparative Examples 1 to 4, a part of the positive electrode active material powder had been taken in advance as a sample for analysis by using the fluorescence XAFS method.

The samples for analysis by using the fluorescence XAFS method were subjected to XAFS analysis by using the fluorescence yield method with a synchrotron X-ray from a large-scaled synchrotron radiation facility (e.g., Super Photon ring-8: SPring-8). The specific procedure is as follows.

First, a sample in an appropriate quantity was applied onto a carbon tape. The carbon tape holding the sample was set on a sample stage in a 19-element Ge semiconductor detector (manufactured by CANBERRA Industries Inc.). For the detector, the ROI (region of interest) was set to the Mn Kα line at an energy of approximately 5900 eV.

And then, the sample was irradiated with an synchrotron X-ray. The intensity of the Mn Kα line was measured while the energy of the synchrotron X-ray irradiation was scanned through changing the angle of the Si (111) crystal monochromator, and thus the fluorescence XAFS spectrum of Mn was acquired by using the fluorescence yield method. By using this procedure, the fluorescence XAFS spectrum data of Mn was acquired for each of the samples in Examples 1 to 4 and Comparative Examples 1 to 4.

The energy of a synchrotron X-ray was calibrated through setting the angle of the Si (111) crystal monochromator to 12.7184° when a pre-edge peak near 8980.3 eV was observed in an XAFS spectrum of a copper foil.

Here, the graph of the fluorescence XAFS spectrum obtained for the sample in Example 1 is shown in FIG. 2. From FIG. 2, the X-ray energy corresponding to an absorption edge, at which the absorption coefficient reached 0.3, was defined and determined as the X-ray absorption edge energy of Mn. An XAFS spectrum was acquired for each of Examples 2 to 4 and Comparative Examples 1 to 4 in the same manner, and the X-ray absorption edge energy of Mn at an absorption edge (a position at which the absorption coefficient reached 0.3) was determined from the graph. The results are shown as "X-ray absorption edge energy of Mn" in Table 1.

A higher value of the X-ray absorption edge energy of Mn indicates that the valence of Mn is higher, i.e., the Mn has been provided with a higher valence.

(2) Measurement of Capacity Recovery Rate after Deep Discharge

The battery after the initial activation treatment in each of Examples 1 to 4 and Comparative Examples 1 to 4 was charged in an environment of 25° C. under what is called −ΔV control, specifically, charged at 1.0 It until the battery voltage after having reached the maximum value was lowered by 10 mV, and then discharged at 0.2 It in the same environment until the battery voltage reached 1.0 V, and the initial capacity was determined.

Thereafter, each battery was left to stand with a resistor of 2Ω connected to the battery in an environment of 60° C. for 14 days to bring the battery into a deeply-discharged state.

Each of the batteries after being brought into a deeply-discharged state was subjected to three charge/discharge cycles in each of which charging was performed at 1.0 It in an environment of 25° C. under −ΔV control and discharging was then performed at 0.2 It in the same environment until the battery voltage reached 1.0 V. And then, the capacity after the third cycle (capacity after deep discharge) was measured.

The capacity recovery rate after deep discharge was determined by using the following equation (I), and the results are shown in Table 1.

$$\text{Capacity recovery rate after deep discharge [\%]} = \text{(capacity after deep discharge/initial capacity)} \times 100 \quad \text{(I)}$$

A higher value of the capacity recovery rate after deep discharge indicates a higher resistance to deep discharge and that destruction of the conductive network is reduced.

TABLE 1

| | Content of Mn in solid solution in base particle [% by mass] | Oxidation treatment of Mn | X-ray absorption edge energy of Mn [eV] | Capacity recovery rate after deep discharge [%] |
|---|---|---|---|---|
| Example 1 | 0.1 | performed | 6548 | 100 |
| Example 2 | 1.0 | performed | 6548 | 100 |
| Example 3 | 2.0 | performed | 6548 | 99 |
| Example 4 | 2.5 | performed | 6548 | 95 |
| Comparative Example 1 | 0.1 | not performed | 6547 | 95 |
| Comparative Example 2 | 1.0 | not performed | 6547 | 92 |
| Comparative Example 3 | 2.0 | not performed | 6547 | 89 |
| Comparative Example 4 | 2.5 | not performed | 6547 | 84 |

(3) Discussion

For the batteries in Examples 1 to 4, the capacity recovery rates after deep discharge are in the range of 95% to 100%. For the batteries in Comparative Examples 1 to 4, on the other hand, the capacity recovery rates after deep discharge are in the range of 84% to 95%. From the results, it can be seen that the capacity recovery rates of the batteries in Examples 1 to 4 are better than those of the batteries in Comparative Examples 1 to 4, and the batteries in Examples 1 to 4 each have an improved resistance to deep discharge in comparison with the batteries in Comparative Examples 1 to 4.

In the batteries in Examples 1 to 4, Mn contained in solid solution in the nickel hydroxide particle in the positive electrode was subject to oxidation treatment and was provided with a higher valence such that the absorption edge energy reached 6548 eV. Accordingly, we infer that reduction of Co in the conductive layer by the Mn is prevented from accelerating even in a deeply-discharged state and deterioration of the bulk portion of the nickel hydroxide particle due to elution of the Mn itself is also prevented; and as a result the conductive network is maintained in a proper state after deep discharge and nickel hydroxide as a positive electrode active material is maintained in a proper state, and thus the batteries in Examples 1 to 4 each have an excellent capacity recovery rate after deep discharge.

In the batteries in Comparative Examples 1 to 4, on the other hand, Mn contained in solid solution in the nickel hydroxide particle in the positive electrode was not subject to oxidation treatment and was not provided with a higher valence. Accordingly, we infer that reduction of Co in the conductive layer by the Mn is accelerated in a deeply-discharged state, and the Mn itself is eluted and the bulk portion of the nickel hydroxide particle becomes brittle and deteriorated; as a result a thin portion of the Co compound layer is reduced and deteriorated in deep discharge and the conductive network is partly destroyed, and thus the batteries in Comparative Examples 1 to 4 each have a lowered capacity recovery rate after deep discharge; and in addition proper battery reaction cannot proceed due to the deterioration of the bulk portion of the nickel hydroxide particle, which also causes the lowering of the capacity recovery rate after deep discharge.

The capacity recovery rate after deep discharge in Comparative Example 1 is 95%. On the other hand, the capacity recovery rate after deep discharge in Example 1 is 100%, a value improved by 5% in comparison with that in Comparative Example 1. In comparison with Example 1 and Comparative Example 1, the content of Mn in solid solution in the nickel hydroxide particle is an identical value of 0.1% by mass and in contrast Example 1 and Comparative Example 1 are different in terms of whether oxidation treatment was performed. Due to this, the X-ray absorption edge energy of Mn is different between Example 1 and Comparative Example 1, the former being 6548 eV and the latter being 6547 eV.

The capacity recovery rate after deep discharge in Comparative Example 2 is 92%. On the other hand, the capacity recovery rate after deep discharge in Example 2 is 100%, a value improved by 8% in comparison with that in Comparative Example 2. In comparison with Example 2 and Comparative Example 2, the content of Mn in solid solution in the nickel hydroxide particle is an identical value of 1.0% by mass and in contrast Example 2 and Comparative Example 2 are different in terms of whether oxidation treatment was performed. Due to this, the X-ray absorption edge energy of Mn is different between Example 2 and Comparative Example 2, the former being 6548 eV and the latter being 6547 eV.

The capacity recovery rate after deep discharge in Comparative Example 3 is 89%. On the other hand, the capacity recovery rate after deep discharge in Example 3 is 99%, a value improved by 10% in comparison with that in Comparative Example 3. In comparison with Example 3 and Comparative Example 3, the content of Mn in solid solution in the nickel hydroxide particle is an identical value of 2.0% by mass and in contrast Example 3 and Comparative Example 3 are different in terms of whether oxidation treatment was performed. Due to this, the X-ray absorption edge energy of Mn is different between Example 3 and Comparative Example 3, the former being 6548 eV and the latter being 6547 eV.

The capacity recovery rate after deep discharge in Comparative Example 4 is 84%. On the other hand, the capacity recovery rate after deep discharge in Example 4 is 95%, a value improved by 11% in comparison with that in Comparative Example 4. In comparison with Example 4 and Comparative Example 4, the content of Mn in solid solution in the nickel hydroxide particle is an identical value of 2.5% by mass and in contrast Example 4 and Comparative Example 4 are different in terms of whether oxidation treatment was performed. Due to this, the X-ray absorption edge energy of Mn is different between Example 4 and Comparative Example 4, the former being 6548 eV and the latter being 6547 eV.

The above comparison between Examples and Comparative Examples suggests that oxidation treatment of Mn to make the absorption edge energy of Mn 6548 eV or high is effective for improvement of the capacity recovery rate after deep discharge even in the case that the content of Mn in solid solution in the nickel hydroxide particle is unchanged.

In order to achieve a capacity recovery rate of 95% or higher, which is the highest capacity recovery rate achieved in Comparative Examples, it is considered effective to set the content of Mn in solid solution in the nickel hydroxide particle to 0.1% by mass to 2.0% by mass and perform oxidation treatment of Mn so that the absorption edge energy of Mn reaches 6548 eV or high.

These results demonstrate that setting the X-ray absorption edge energy of Mn in a nickel hydroxide particle containing Mn in solid solution to 6548 eV as measured by using the fluorescence XAFS method allows for providing a battery which takes advantage of excellent cycle life characteristics derived from Mn contained in solid solution and is less affected by deep discharge and in which lowering of the capacity recovery rate is reduced.

The present invention is never limited to the above-described embodiments and Examples, and may be variously modified. A battery to be used for the present disclosure is only required to be an alkaline secondary battery, and examples thereof include, in addition to nickel-hydrogen secondary batteries, nickel-cadmium secondary batteries and nickel-zinc secondary batteries. The mechanical structure of a battery is not limited, and not only a circular battery but also a square battery may be used.

The disclosure being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of producing a positive electrode active material for an alkaline secondary battery, the positive electrode active material comprising a core particle comprising a solid solution of unoxidized nickel hydroxide and Mn and a Co compound covering the core particle, the method comprising:

an intermediate product particle preparation step of preparing an intermediate product particle including a base particle comprising a nickel hydroxide particle containing Mn in solid solution and a conductive layer comprising a Co compound and covering a surface of the base particle;

a step of preparing a sodium chlorite aqueous solution containing 5.0% to 20.0% sodium chlorite by mass; and an oxidization step of selectively oxidizing the Mn contained in the intermediate product particle by heating the sodium chlorite aqueous solution and treating the intermediate product particle with the heated aqueous solution such that an X-ray absorption edge energy of the Mn detected within 6500 to 6600 eV by measurement with an XAFS (X-ray Absorption Fine Structure) method is increased to 6548 eV or higher, thereby providing the positive electrode active material.

2. The method of claim 1, wherein a content of the Mn in the base particle is 0.1% by mass or more and 2.0% by mass or less based on a quantity of the nickel hydroxide.

3. The method of claim 1, wherein the conductive layer contains an alkali metal.

4. The method of claim 3, wherein the alkali metal is Na.

5. The method of claim 3, wherein the alkali metal is Na and Li.

6. The method of claim 1, wherein the measurement with an XAFS method is XAFS measurement with a fluorescence yield method.

7. A method of producing an alkaline secondary battery comprising a container and an electrode group contained together with an alkaline electrolytic solution in the container, the method comprising:
    producing a positive electrode active material according to the method of claim 1; and
    forming the electrode group with a negative electrode and a positive electrode that contains the positive electrode active material, the negative electrode and the positive electrode being laminated with a separator sandwiched therebetween, the electrode group being provided inside the container; and
    injecting the alkaline electrolytic solution into the container.

8. The method of claim 7, further comprising:
    sealing the container after injecting the alkaline electrolytic solution into the container.

\* \* \* \* \*